(12) United States Patent
Jones et al.

(10) Patent No.: US 10,366,509 B2
(45) Date of Patent: Jul. 30, 2019

(54) SETTING DIFFERENT BACKGROUND MODEL SENSITIVITIES BY USER DEFINED REGIONS AND BACKGROUND FILTERS

(71) Applicant: Thermal Imaging Radar, LLC, Orem, UT (US)

(72) Inventors: Lawrence Richard Jones, Mapleton, UT (US); Bryce Hayden Lembke, South Jordan, UT (US); Sezai Sablak, Lancaster, PA (US); Michael D. Dortch, Saratoga Springs, UT (US); Larry J. Price, South Jordan, UT (US)

(73) Assignee: Thermal Imaging Radar, LLC, Orem, UT (US)

( * ) Notice: Subject to any disclaimer, the term of this patent is extended or adjusted under 35 U.S.C. 154(b) by 0 days.

(21) Appl. No.: 15/562,798

(22) PCT Filed: Mar. 29, 2016

(86) PCT No.: PCT/US2016/024694
§ 371 (c)(1),
(2) Date: Sep. 28, 2017

(87) PCT Pub. No.: WO2016/160794
PCT Pub. Date: Oct. 6, 2016

(65) Prior Publication Data
US 2018/0286075 A1    Oct. 4, 2018

Related U.S. Application Data

(60) Provisional application No. 62/140,942, filed on Mar. 31, 2015.

(51) Int. Cl.
*G06T 7/73* (2017.01)
*G06F 3/041* (2006.01)
(Continued)

(52) U.S. Cl.
CPC .............. *G06T 7/75* (2017.01); *G06F 3/041* (2013.01); *G06F 3/0488* (2013.01);
(Continued)

(58) Field of Classification Search
CPC ............ G06F 3/04842; G06F 3/04845; G06F 17/30259; G06F 17/30268;
(Continued)

(56) References Cited

U.S. PATENT DOCUMENTS

| | | |
|---|---|---|
| 3,336,810 A | 8/1967 | Schaffer et al. |
| 3,648,384 A | 3/1972 | Roberts |

(Continued)

FOREIGN PATENT DOCUMENTS

| | | |
|---|---|---|
| CN | 1254856 | 5/2000 |
| CN | 1485690 | 3/2004 |

(Continued)

OTHER PUBLICATIONS

Chu, Elbert. "Invention Awards 2014: 360-Degree Infrared Vision." Popular Science. May 5, 2014. Web. Accessed Feb. 27, 2015.

(Continued)

*Primary Examiner* — Aklilu K Woldemariam
(74) *Attorney, Agent, or Firm* — Workman Nydegger (57) ABSTRACT

Creating a background model for image processing to identify new foreground objects in successive video frames. A method includes providing a background image in a user interface. The method further includes receiving a first user input in the user interface that comprises an identification of one or more different regions within the background image. The method further includes receiving a second user input in the user interface that comprises a selection of an image change tolerance for each of the identified different regions. The method further includes providing the background image, information identifying the different regions, and the (Continued)

image change tolerances to an image processor. The background image, the information identifying the different regions, and the image change tolerances are used by the image processor to create a background model to thereby compare a successive image with the background model in order to identify foreground objects within the successive image.

20 Claims, 8 Drawing Sheets

(51) Int. Cl.
*H04N 5/232* (2006.01)
*H04N 5/272* (2006.01)
*G06F 3/0488* (2013.01)
*G06F 3/0484* (2013.01)
*G06T 3/40* (2006.01)
*G06T 7/194* (2017.01)
*G06T 7/13* (2017.01)
*G06N 20/00* (2019.01)

(52) U.S. Cl.
CPC ...... *G06F 3/04842* (2013.01); *G06F 3/04845* (2013.01); *G06N 20/00* (2019.01); *G06T 3/4038* (2013.01); *G06T 7/13* (2017.01); *G06T 7/194* (2017.01); *H04N 5/23238* (2013.01); *H04N 5/272* (2013.01)

(58) Field of Classification Search
CPC ......... G06F 17/30274; G06F 17/30554; G06F 17/30867; G06F 3/005; G06F 3/04815; G06F 3/04817; G06F 3/0482; G06F 3/04883; G06F 15/18; G06F 3/041; G06F 3/0488; G06F 3/0304; G06F 3/011; G06F 3/017; G06T 7/194; G06T 11/001; G06T 13/20; G06T 13/40; G06T 13/80; G06T 15/205; G06T 17/00; G06T 17/20; G06T 19/006; G06T 2200/04; G06T 2200/24; G06T 2207/10012; G06T 2207/10028; G06T 2207/20212; G06T 2207/30196; G06T 2210/16; G06T 7/11; G06T 3/4038; G06T 7/13; G06T 7/75; G06T 2207/10016; G06T 2207/20021; G06T 7/12; G06T 7/149; G06T 7/174; G06T 7/246; G06T 7/344; G06T 7/60; G06T 2207/30236; G06T 2207/30248; G06T 7/20; G06T 7/251; G06K 9/6215; G06K 9/627; G06K 9/00281; G06K 9/3233; G06K 9/4628; G06K 9/66; G06K 9/00369; G06K 9/38; G06K 9/00342; G06K 9/00624; G06K 9/00201; G06K 9/00671; G06K 9/00771; G06K 9/00805; G06K 9/3241; G06Q 10/087; G06Q 30/0605; G06Q 30/0625; G06Q 30/0629; G06Q 30/0631; G06Q 30/0643; G06Q 50/01; G06Q 10/067; G06Q 10/10; G06Q 30/02; G06Q 30/0601; G06Q 40/12; H04N 13/204; H04N 13/207; H04N 13/271; H04N 13/282; H04N 5/33; H04N 5/23238; H04N 5/272; H04N 7/18; H04N 7/183; H04N 7/181; H04N 5/2621; G06N 7/005; G06N 3/0454; A63F 13/213; A63F 13/215; A63F 13/56; A63F 2300/1043; A63F 2300/1081; A63F 2300/1087; A63F 2300/6045; G03B 35/00; G08B 13/19645

USPC .................. 348/239, 77, 135, 142, 143, 148; 382/103, 131, 190, 266
See application file for complete search history.

(56) References Cited

U.S. PATENT DOCUMENTS

| | | |
|---|---|---|
| 3,769,501 A | 10/1973 | McDonough |
| 3,883,788 A | 5/1975 | Storey, Jr. |
| 4,263,513 A | 4/1981 | Palluet |
| 4,465,959 A | 8/1984 | Yajima |
| 4,602,857 A | 7/1986 | Woltz et al. |
| 4,710,691 A | 12/1987 | Bergstrom |
| 4,922,275 A | 5/1990 | Hughes |
| 4,977,323 A | 12/1990 | Jehle |
| 4,982,218 A | 1/1991 | Tsuboi et al. |
| 4,988,938 A | 1/1991 | Yukihiro |
| 5,453,618 A | 9/1995 | Sutton |
| 5,598,207 A | 1/1997 | Kormos |
| 5,650,813 A | 7/1997 | Gilblom |
| D381,997 S | 8/1997 | Morooka |
| 5,752,113 A | 5/1998 | Borden |
| 5,790,183 A | 8/1998 | Kerbyson |
| 5,807,950 A | 9/1998 | Da Silva |
| 6,023,588 A | 2/2000 | Ray |
| 6,034,716 A | 3/2000 | Whiting |
| 6,071,740 A | 6/2000 | Duffy |
| 6,088,534 A | 7/2000 | Tominaga |
| 6,133,943 A | 10/2000 | Needham |
| D435,577 S | 12/2000 | McBride |
| 6,215,115 B1 * | 4/2001 | Baker ................ G01S 3/7864 250/214 C |
| 6,304,284 B1 | 10/2001 | Dunton |
| 6,388,414 B1 | 5/2002 | Kobayashi |
| 6,539,162 B1 | 3/2003 | Stephenson |
| D482,712 S | 11/2003 | Hsu |
| 6,677,982 B1 | 1/2004 | Chen |
| 6,678,001 B1 | 1/2004 | Elberbaum |
| D486,847 S | 2/2004 | Uehara |
| 6,731,799 B1 * | 5/2004 | Sun .................. G06K 9/00369 348/142 |
| 6,738,073 B2 | 5/2004 | Park et al. |
| 6,738,569 B1 | 5/2004 | Sogabe |
| 6,809,887 B1 | 10/2004 | Gao |
| 6,948,402 B1 | 9/2005 | Amendolea |
| 6,991,384 B1 | 1/2006 | Davis |
| 6,992,722 B2 | 1/2006 | Jung |
| D520,548 S | 5/2006 | Tsai |
| 7,088,907 B1 | 8/2006 | Nishijima |
| D543,644 S | 5/2007 | Bembridge |
| 7,324,135 B2 | 1/2008 | Ouchi et al. |
| 7,381,952 B2 | 6/2008 | Teich et al. |
| 7,423,272 B2 | 9/2008 | Hasegawa et al. |
| 7,436,438 B2 | 10/2008 | Sim et al. |
| 7,525,567 B2 | 4/2009 | McCutchen |
| 7,561,187 B2 | 7/2009 | Umezaki |
| 7,732,771 B2 | 6/2010 | Hasegawa et al. |
| D640,721 S | 6/2011 | Satine |
| 7,991,575 B2 | 8/2011 | Vogel et al. |
| 8,106,936 B2 | 1/2012 | Strzempko et al. |
| 8,194,912 B2 | 6/2012 | Kitaura et al. |
| 8,285,512 B2 | 10/2012 | Vogel et al. |
| D673,988 S | 1/2013 | Riegl |
| 8,355,042 B2 | 1/2013 | Lablans |
| 8,594,483 B2 | 11/2013 | Koyanagi |
| D695,809 S | 12/2013 | Katori |
| 8,773,503 B2 | 7/2014 | Dortch et al. |
| D728,655 S | 5/2015 | Daniel |
| 9,348,196 B1 | 5/2016 | Dortch |
| 9,390,604 B2 | 7/2016 | Dortch et al. |
| 9,516,208 B2 | 12/2016 | Dortch et al. |
| D776,181 S | 1/2017 | Dortch et al. |
| 9,685,896 B2 | 6/2017 | Dortch et al. |
| 2001/0026684 A1 | 10/2001 | Sorek et al. |
| 2001/0027456 A1 | 10/2001 | Lancaster et al. |
| 2002/0025023 A1 | 2/2002 | Herold et al. |
| 2002/0184017 A1 * | 12/2002 | Lee ................ G10L 25/87 704/236 |

(56) References Cited

U.S. PATENT DOCUMENTS

| | | |
|---|---|---|
| 2002/0185926 A1 | 12/2002 | King |
| 2003/0025599 A1 | 2/2003 | Monroe |
| 2003/0174056 A1 | 9/2003 | Harshaw |
| 2003/0197785 A1 | 10/2003 | White |
| 2004/0075741 A1 | 4/2004 | Berkey et al. |
| 2004/0155558 A1 | 8/2004 | Cuttino |
| 2004/0179098 A1 | 9/2004 | Haehn |
| 2004/0183941 A1 | 9/2004 | McCutchen |
| 2004/0257026 A1 | 12/2004 | Rogers |
| 2005/0152447 A1 | 7/2005 | Jouppi |
| 2005/0261820 A1 | 11/2005 | Feeney |
| 2005/0285953 A1 | 12/2005 | Hasegawa |
| 2006/0179463 A1 | 8/2006 | Chisholm |
| 2007/0061735 A1 | 3/2007 | Hoffberg |
| 2007/0115527 A1 | 5/2007 | Lee |
| 2008/0106593 A1 | 5/2008 | Arfvidsson et al. |
| 2008/0159732 A1 | 7/2008 | Young |
| 2008/0267477 A1 | 10/2008 | Conti |
| 2009/0051310 A1 | 2/2009 | Chandhoke |
| 2009/0066796 A1* | 3/2009 | Karasyuk ............... G02B 5/201 348/187 |
| 2009/0087096 A1* | 4/2009 | Eaton ....................... G06K 9/38 382/190 |
| 2009/0309966 A1* | 12/2009 | Chen ......................... G06T 7/20 348/135 |
| 2010/0020310 A1 | 1/2010 | Merklein |
| 2010/0091089 A1 | 4/2010 | Cromwell et al. |
| 2010/0097444 A1 | 4/2010 | Lablans |
| 2010/0142757 A1 | 6/2010 | Sandstrom et al. |
| 2010/0303289 A1* | 12/2010 | Polzin ................. G06K 9/00342 382/103 |
| 2011/0058036 A1 | 3/2011 | Metzger |
| 2011/0174762 A1 | 7/2011 | Tsai |
| 2011/0220797 A1 | 9/2011 | Hoelter et al. |
| 2011/0293180 A1 | 12/2011 | Criminisi |
| 2011/0293247 A1 | 12/2011 | Bhagavathy |
| 2011/0316970 A1 | 12/2011 | Cheong |
| 2012/0051588 A1* | 3/2012 | McEldowney ........ G03B 17/54 382/103 |
| 2012/0127169 A1 | 5/2012 | Barcay et al. |
| 2012/0133639 A1 | 5/2012 | Kopf et al. |
| 2012/0155744 A1 | 6/2012 | Kennedy |
| 2012/0176401 A1 | 7/2012 | Hayward |
| 2012/0194564 A1 | 8/2012 | White et al. |
| 2012/0293334 A1 | 11/2012 | Yu |
| 2012/0299920 A1 | 11/2012 | Coombe et al. |
| 2012/0300019 A1 | 11/2012 | Yang et al. |
| 2012/0314066 A1 | 12/2012 | Lee et al. |
| 2012/0320148 A1 | 12/2012 | Unger |
| 2013/0002807 A1 | 1/2013 | Vogel et al. |
| 2013/0009588 A1 | 1/2013 | Kazutoshi |
| 2013/0030699 A1 | 1/2013 | Barnes et al. |
| 2013/0044108 A1* | 2/2013 | Tanaka ..................... G06T 15/04 345/419 |
| 2013/0048855 A1 | 2/2013 | Abreo |
| 2013/0050260 A1* | 2/2013 | Reitan ..................... G06F 3/011 345/633 |
| 2013/0079955 A1 | 3/2013 | Masiello et al. |
| 2013/0103303 A1 | 4/2013 | Lynch |
| 2013/0113827 A1 | 5/2013 | Forutanpour et al. |
| 2013/0155229 A1* | 6/2013 | Thornton ................. H04N 7/18 348/143 |
| 2013/0162867 A1 | 6/2013 | Gupta |
| 2013/0176130 A1 | 7/2013 | Hoesl |
| 2013/0188010 A1 | 7/2013 | Dortch et al. |
| 2013/0249947 A1* | 9/2013 | Reitan ..................... G06F 3/011 345/633 |
| 2014/0028712 A1* | 1/2014 | Keating ................ G06T 19/006 345/633 |
| 2014/0176565 A1* | 6/2014 | Adeyoola ............. G06T 19/006 345/473 |
| 2014/0192184 A1 | 7/2014 | Wu |
| 2014/0282275 A1* | 9/2014 | Everitt .................... G06F 3/017 715/863 |
| 2015/0062337 A1 | 3/2015 | Scalisi |
| 2015/0116741 A1 | 4/2015 | Ogino |
| 2015/0365607 A1 | 12/2015 | Yang |
| 2016/0021295 A1* | 1/2016 | Krestyannikov ........ G02B 7/36 348/345 |
| 2016/0225159 A1* | 8/2016 | Sato ......................... G06T 7/11 |
| 2017/0024898 A1* | 1/2017 | Spector .................... G06T 7/60 |
| 2018/0286075 A1* | 10/2018 | Jones ..................... G06F 3/041 |

FOREIGN PATENT DOCUMENTS

| | | |
|---|---|---|
| CN | 1639751 | 7/2005 |
| CN | 102176270 | 9/2011 |
| CN | 102280005 | 12/2011 |
| CN | 10286835 A | 4/2015 |
| EP | 2492883 | 8/2012 |
| GB | 2433127 | 6/2007 |
| JP | 2000236461 | 8/2000 |
| JP | 2003123157 | 4/2003 |
| JP | 200613832 | 1/2006 |
| JP | 2006333133 | 12/2006 |
| JP | 2007271869 | 10/2007 |
| JP | 2008236632 | 10/2008 |
| JP | 2011199750 | 10/2011 |
| JP | 2011239195 | 11/2011 |
| JP | 201265273 | 3/2012 |
| JP | 2012113204 | 6/2012 |
| KR | 10-2009-0067762 | 6/2009 |
| RU | 2012140240 | 9/2012 |
| TW | 401687 | 8/2000 |
| WO | 2004/008407 | 1/2004 |
| WO | 2012/007049 | 1/2012 |
| WO | 2012/029063 | 3/2012 |
| WO | 2013/109742 | 7/2013 |
| WO | 2013/109976 | 7/2013 |
| WO | 2014/169061 | 10/2014 |
| WO | 2014/169066 | 10/2014 |
| WO | 2015/021186 | 2/2015 |
| WO | 2016160794 | 10/2016 |

OTHER PUBLICATIONS

Hughes, et al., "Electromagnetic Damping in Stepping Motors," in *Proceedings of the Institution of Electrical Engineers*, vol. 122, No. 8, Published Aug. 1, 1975.

Supplemental European Search Report for 14835456.6 dated May 11, 2017, 11 pages.

International Search Report and Written Opinion for PCT/US2016/024694 dated Jun. 24, 2016, 14 pages.

U.S. Appl. No. 13/745,514, Jan. 10, 2014, Office Action.
U.S. Appl. No. 13/745,514, Apr. 11, 2014, Notice of Allowance.
U.S. Appl. No. 14/456,329, May 14, 2015, Restriction Requirement.
U.S. Appl. No. 14/456,329, Oct. 1, 2015, Office Action.
U.S. Appl. No. 14/652,009, Nov. 18, 2015, Office Action.
U.S. Appl. No. 14/652,006, Nov. 20, 2015, Office Action.
U.S. Appl. No. 14/456,329, Jan. 21, 2016, Notice of Allowance.
U.S. Appl. No. 14/652,006, Mar. 22, 2016, Final Office Action.
U.S. Appl. No. 14/652,009, Apr. 18, 2016, Notice of Allowance.
U.S. Appl. No. 29/523,032, Apr. 21, 2016, Office Action.
U.S. Appl. No. 14/738,391, Apr. 25, 2016, Office Action.
U.S. Appl. No. 14/652,006, Jul. 12, 2016, Office Action.
U.S. Appl. No. 29/523,032, Jul. 20, 2016, Notice of Allowance.
U.S. Appl. No. 14/738,391, Aug. 4, 2016, Notice of Allowance.
U.S. Appl. No. 14/652,006, Oct. 21, 2016, Final Office Action.
U.S. Appl. No. 14/652,006, Feb. 22, 2017, Notice of Allowance.
U.S. Appl. No. 15/159,523, Sep. 8, 2017, Office Action.

Austin, David, "Generate Stepper-Motor Speed Profiles in Real Time," Dec. 30, 2004, 13 pages, Available at https://www.embedded.com/design/mcus-processors-and-socs/4006438/Generate-stepper-motor-speed-profiles-in-real-time.

Electro Optical Industries "Spynel-M Thermal Radar for Intrusion Detection," based on information and belief, available at least as early as Mar. 7, 2018, 4 pages.

\* cited by examiner

SETTING DIFFERENT BACKGROUND MODEL SENSITIVITIES BY USER DEFINED REGIONS AND BACKGROUND FILTERS

CROSS-REFERENCE TO RELATED APPLICATIONS

This application is a Nationalization of PCT/US2016/024694 filed Mar. 29, 2016 which claims the benefit of U.S. Provisional Application No. 62/140,942 filed Mar. 31, 2015, titled "SETTING DIFFERENT BACKGROUND MODEL SENSITIVITIES BY USER DEFINE REGIONS AND BACKGROUND FILTERS", which is incorporated herein by reference in its entirety.

BACKGROUND

Panoramic images can be created by an array of wide angle cameras that together create up to a 360 degree field of view or by one camera with a fish eye lens or other panoramic mirror that allows for a continuous "mirror ball" image that is later flattened out by computer.

A relatively new means of capturing panoramic images is by continuously spinning a thermal sensor or other high speed camera at less than 60 RPM and processing the images from the camera with a computer where they may be stitched together and analyzed.

A common first step for performing video analysis is to develop a background model from successive video frames and then to compare new frames against that background model to look for changes that could be foreground movement. As some background objects (such as trees, banners, etc.) can have movement and change, a certain amount of tolerance should be built in for movement to the analysis to view these objects as background and not foreground objects. This tolerance is typically set for the entire video image and used for all changes regardless of where they are in the video frame.

Relatedly, object classification in computer vision requires identifying characteristics about a foreground object that make it a likely match to a real world object, such as a person, animal or vehicle. Calculations performed to identify these characteristics can be computationally expensive, limiting the amount of analysis that can be performed on embedded or lower power systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of creating a background model for image processing to identify new foreground objects in successive video frames. The method includes providing a background image in a user interface. The method further includes receiving a first user input in the user interface. The first user input comprises an identification of one or more different regions within the background image. The method further includes receiving a second user input in the user interface. The second user input comprises a selection of an image change tolerance for each of the one or more identified different regions. The method further includes providing the background image, information identifying the one or more different regions, and the image change tolerances to an image processor. The background image, the information identifying the one or more different regions, and the image change tolerances are used by the image processor to create a background model to thereby compare a successive image with the background model in order to identify foreground objects within the successive image.

In another embodiment, a method of identifying a foreground object in a video frame by comparing the video frame to a background model is illustrated. The method includes obtaining a background model. The background model comprises a background image and identifies one or more user defined regions. Each of the one or more user defined regions includes an image change tolerance. The method further includes obtaining a video frame and evaluating the video frame against the background model such that a foreground object is identified in a region of the video frame when a score for the foreground object exceeds the image change tolerance for the region in which the foreground object is located. Image change tolerance for each user defined region may be independently selected and adjusted by the user.

In yet another embodiment, a method of identifying foreground objects of interest in a video frame is illustrated. The method further includes obtaining a background model, wherein the background model comprises a background image. The method further includes obtaining a video frame and evaluating the video frame against the background model to identify objects. This includes identifying differences between the video frame and the background image. The method further includes applying one or more filters to the identified differences to identify one or more foreground objects of interest in the video frame.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

As noted above, background objects (such as trees, banners, etc.) in successive images can have movement, which represents change between images. In particular, when objects in the background move, the pixels in successive images will be different, and thus, pixels in one image are changed with respect to another image. Thus, a certain amount of pixel change tolerance should be built in for movement to the analysis to view these objects as background and not foreground objects. A similar scenario occurs where change occurs in the background (e.g., sunrise or sunset), which may appear to change objects (e.g., trees, power poles, utility trailers, stockyard equipment and buildings, and the like) in the foreground, as the effect of the background sun may alter their appearance, making it appear as if the foreground object has changed, when in fact it may have not.

However, this pixel change tolerance is typically set for the entire video image and used for all changes regardless of where they are in the video frame. Some embodiments described herein allow for setting different background model sensitives by user defined regions in an image. Such embodiments may be designed for embedded systems with limited resources (such as limited processing power and memory) which rates amount of variance between background model and movement as a score for the foreground object. The user can set up any number of regions in the image with different scores. The score of each change, i.e., the amount of pixel change, is compared to the region in which the movement is detected to determine whether this movement should be detected as a foreground change or simply background movement (e.g., due to sunrise, or sunset). This gives the user greater flexibility in determining how to treat change in video frames. This can result in reducing the frequency and number of false positive alerts (e.g., a conclusion that an intruder is present, when none is), while also maintaining reliability, so that an alert is provided when it actually should be (e.g., an intruder is in fact present).

Also as discussed above, object classification in computer vision requires identifying characteristics about a foreground object that make it a likely match to a real world object, such as a person, animal or vehicle. Calculations performed to identify these characteristics can be computationally expensive, limiting the amount of analysis that can be performed on embedded or lower power systems. Embodiments may use a number of filters to more effectively reduce the number of objects that require CPU intensive calculation. These filters may include one or more of distance filters used to determine the relative size of the object, a cross correlation filter to determine if the object matches a background model, an edge detection filter, an aspect ratio filter, a thermal filter to filter objects based on thermal characteristics, and so forth. These filters can help to reduce false detection of foreground objects and facilitate computationally inexpensive algorithms for determining object classification.

In some embodiments, a background model is used to compare the new image for changes within regions of interest. Each region of interest has a change tolerance used to determine if the change is of a great enough magnitude to be considered for later filters. In this way, the two features described above can be combined. This may be particularly useful for object classification in low power systems or to otherwise conserve power in systems.

Figure 1:
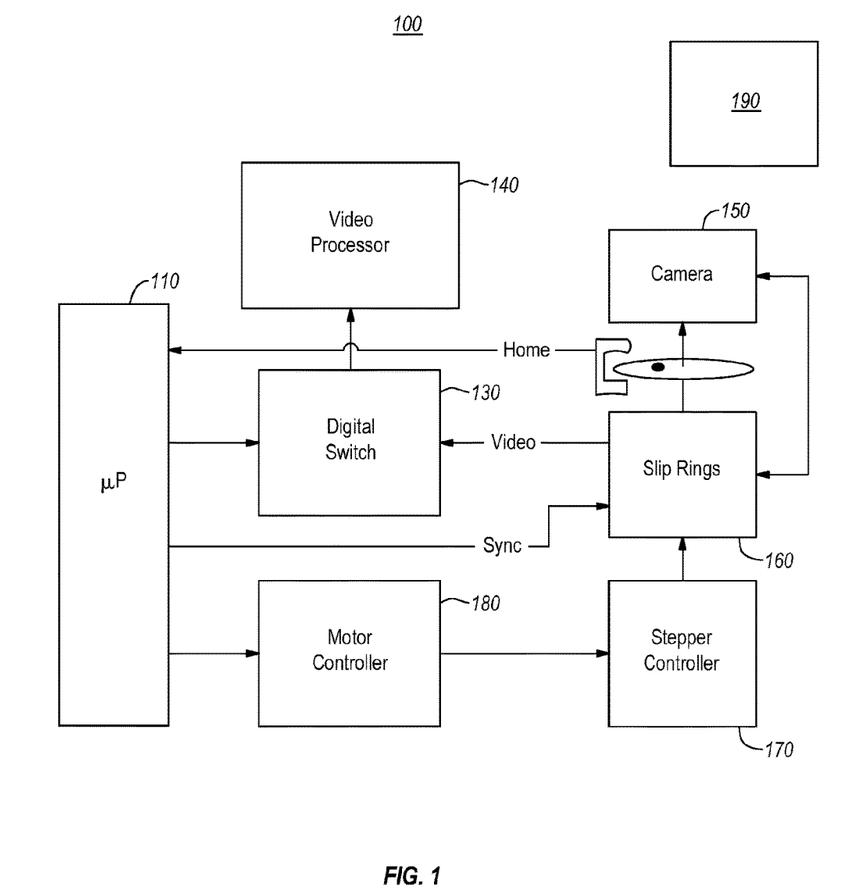
FIG. 1 schematically illustrates an example computing system in which the principles described herein may operate.

The following now illustrates a general environment where embodiments may be practiced. FIG. 1 illustrates a block diagram for camera system 100. Camera system 100 allows camera 150 (e.g., a thermal imaging camera) to rotate up to a full 360° around a fixed-axis. The full revolution comprises a number of positions corresponding to "stops" where it is desired that an image be captured. Because of requirements related to camera calibration, particularly with a thermal imaging camera, the camera can capture images at a constant frame rate. The spectrum captured may be from about 8,000 nm to about 14,000 nm. Of course, it may be possible to employ concepts disclosed herein within systems configured to capture and use image data based on other spectrums (e.g., visible light, or higher or lower wavelengths). When capturing images at a constant frame rate, some of the images may correspond to positions between designated "stop" positions, while others will correspond to a "stop" position. As will be described in further detail hereafter, only those images corresponding to a "stop" position may be retained. The others may be discarded.

The positions where camera 150 captures images that will be retained are referred to herein as stop positions because camera 150 must be stationary, or momentarily stopped, in order for camera 150 to acquire a non-blurry image. A stop position can be characterized as having an angle offset relative to a designated home position (i.e., "stop" 1) at which camera 150 captures an image. In some implementations, the system may determine the home position by using a camera-mount with a hole, along with a transmissive optical encoder that can detect the home position when the hole in the camera-mount lines up with the encoder. Such a transmissive optical encoder may be a 1-bit encoder. In other implementations, a higher resolution encoder may be used to allow more granular feedback of actual camera position at any given time.

Camera system 100 can allow any number of stop positions per revolution. In an embodiment, the number of stop positions may be between 1 and 16. The stops may be positioned at equally spaced intervals. For example, ten stop positions, or stops, per revolution would result in ten stops that are located 36° apart. The camera system 100 may use any suitable motor mechanism for ensuring that the camera remains momentarily stationary at each stop position, so as to facilitate capture of a non-blurry image at each desired stop position. For example, a stepper motor may be employed to hold camera 150 stationary at each stop position for the appropriate amount of time to acquire an image before moving to the next stop position. Details of an exemplary stepper motor mechanism are disclosed in the inventors PCT Patent Application Serial No. PCT/US/2014/033539 filed Apr. 9, 2014 titled STEPPER MOTOR CONTROL AND FIRE DETECTION SYSTEM, herein incorporated by reference in its entirety. Another example of a motor mechanism that may be employed in rotating the camera through a plurality of stop positions in which the camera remains stationary momentarily at each stop position includes a mechanical cam system, e.g., as described in the inventors U.S. Pat. No. 8,773,503 issued Jul. 8, 2014 and titled AUTOMATED PANORAMIC CAMERA AND SENSOR PLATFORM WITH COMPUTER AND OPTIONAL POWER SUPPLY, herein incorporated by reference in its entirety. Motor mechanisms as described in the above patents and applications, as well as any other suitable design may be employed.

As depicted in FIG. 1, the system can utilize two processors, microprocessor 110 and video processor 140. Microprocessor 110 can manage position and timing of camera 150, while video processor 140 can process video from camera 150. Utilizing two processors allows the real-time performance of the camera 150 and motor synchronization by the microprocessor 110 to be de-coupled from the high-throughput video processor 140. Alternatively, some implementations may use one processor to manage position and timing, as well as video of the camera 150. Of course, more than two processors could alternatively be employed.

Figure 2A:
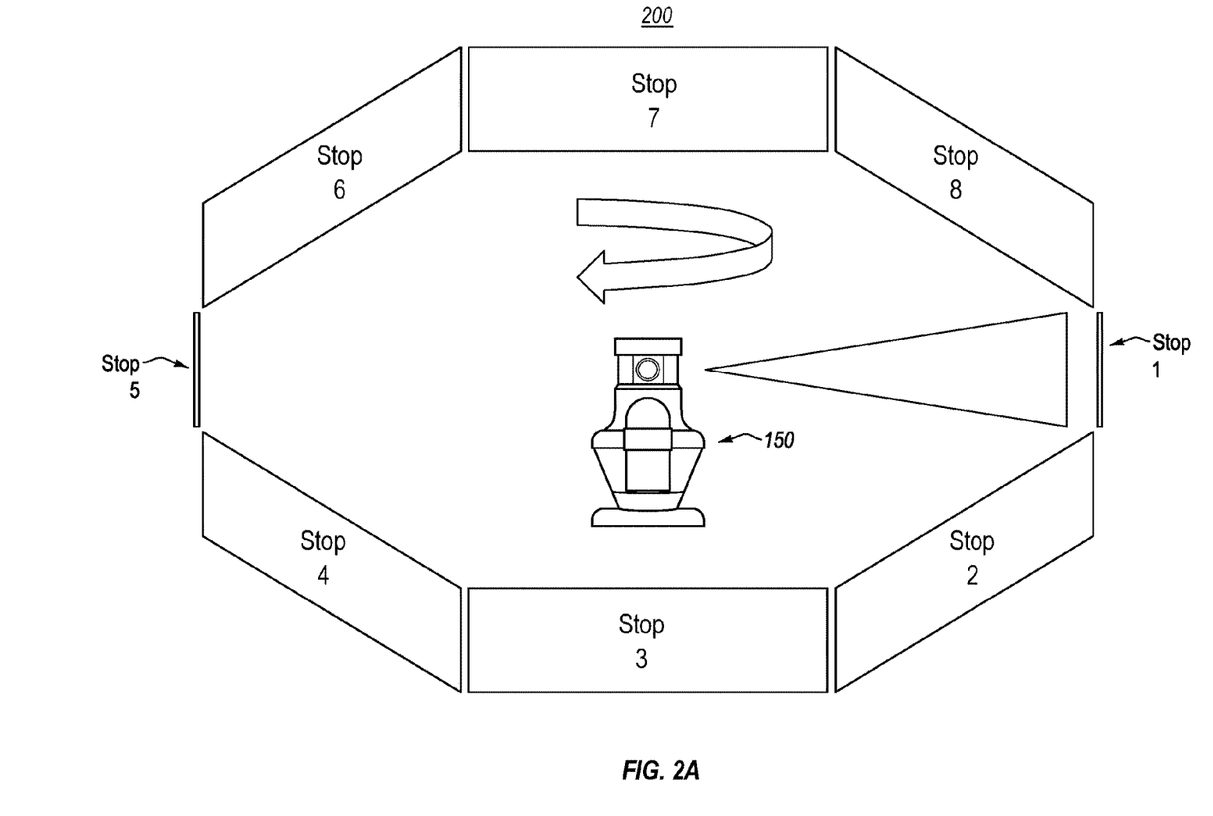
FIG. 2A schematically illustrates virtual camera positions, also referred to herein as stop positions, where the camera may rotate in a clockwise direction, with the camera pointed at stop position 1.
Figure 2B:
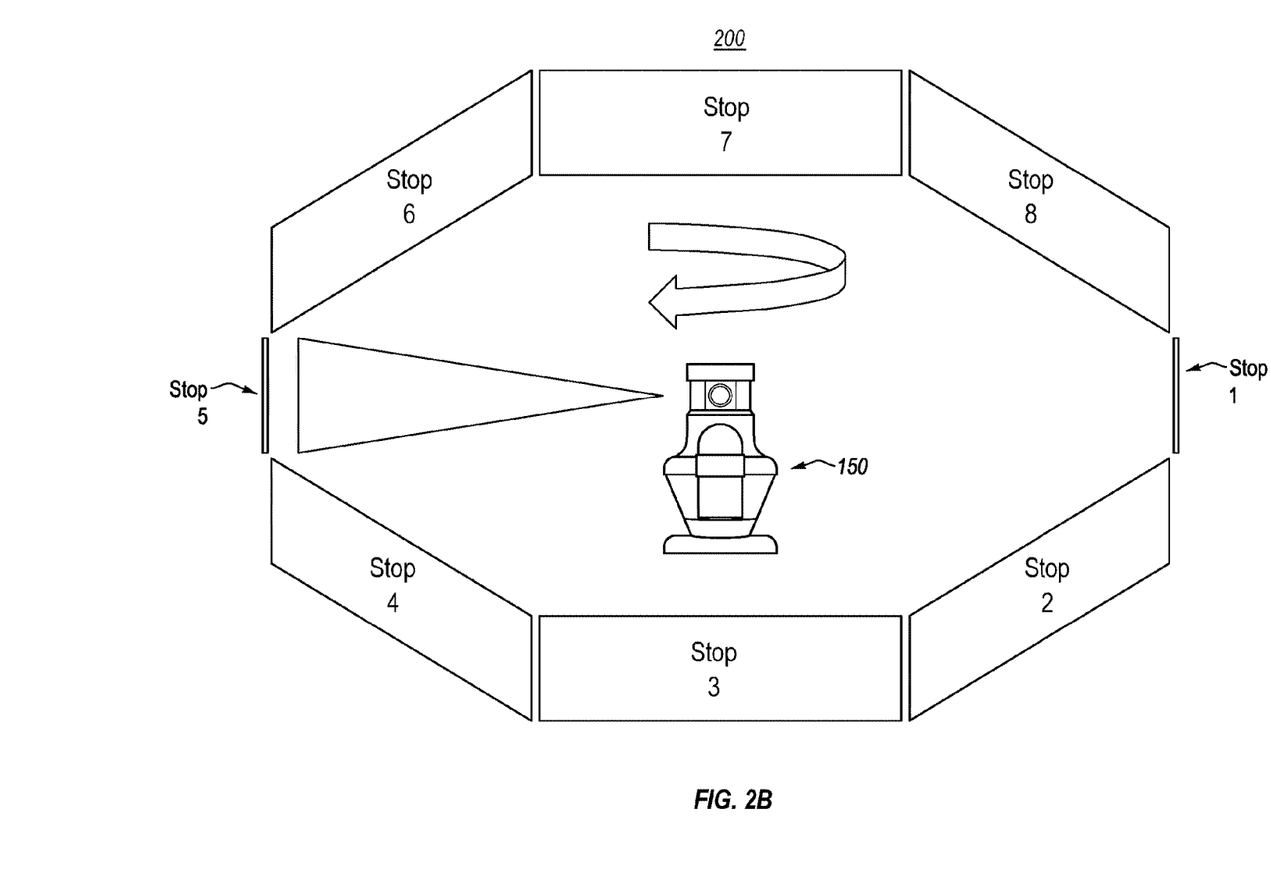
FIG. 2B schematically illustrates virtual camera positions, as in FIG. 2A, with the camera pointed at stop position 5.

In an implementation, data from the camera 150 passes through slip rings 160, which allows the camera 150 to rotate as described above (continuous rotation with intermittent, very short stops). Because the periods where the camera is actually stationary are so short, the camera may appear to rotate continuously. In some cases, the camera frame rate may not exactly match the rotational speed and stop rate of the camera system 100, thus creating fractional video frames. Digital switch 130 may then be used to throw away any unwanted video frames. In other words, as described above, some captured frames may correspond to one of the stop positions, while other captured frames may be captured while the camera is rotating. Using the digital switch 130 allows the video processor 140 to sleep during those times at which unwanted video frames are discarded, thus creating better power efficiency. Of course, in other embodiments of the system, the video processor (e.g., ARM/DSP) may have little or no time to sleep.

Where an image is taken at each stop position, each stop position can be represented as an individual virtual camera. A virtual camera may act like a stationary camera pointed in a single direction. The camera system 100 can support any number of stop positions and corresponding number of virtual cameras. In an embodiment, system 100 may include from 1 to 16 stop positions, and 1 to 16 virtual cameras, each virtual camera associated with a particular stop position. FIG. 2A illustrates how each stop position may correlate to a physical space with the camera 150 facing stop position 1 (i.e., home position). FIG. 2B shows the camera 150 having rotated so as to be facing stop position 5. As depicted in FIGS. 2A and 2B, a numbering system used for the stop positions may increase in a clockwise direction. FIGS. 2A and 2B illustrate an exemplary configuration including 8 stop positions, although it will be understood that more or fewer stop positions may be provided. By way of example, the number of stop positions may be from 2 to about 30, from 4 to about 20, or from 6 to about 16.

The period in which the camera is momentarily stopped may be any suitable period of time (e.g., may depend on the characteristics of the image capture capabilities of the camera). In an embodiment, each stop period (i.e., the dwell time) may be from about 30 ms to about 120 ms (e.g., about 60 ms).

Each image captured by camera 150 corresponding to a stop position may be multiplexed, or muxed, into a video stream and sent to video processor 140. Each image captured by camera 150 to be retained may be sent out of the camera over the same interface. Microprocessor 110 can manage and track the angle offset (and corresponding stop position) of camera 150 when an image to be retained is captured (i.e., the image corresponds to a stop position). Even images that are to be discarded (i.e., the image does not correspond to a stop position), may be sent to digital switch 130 over the same interface as retained images. At digital switch 130, those images that are to be discarded may be separated and discarded, rather than passed on to video processor 140.

Figure 3:
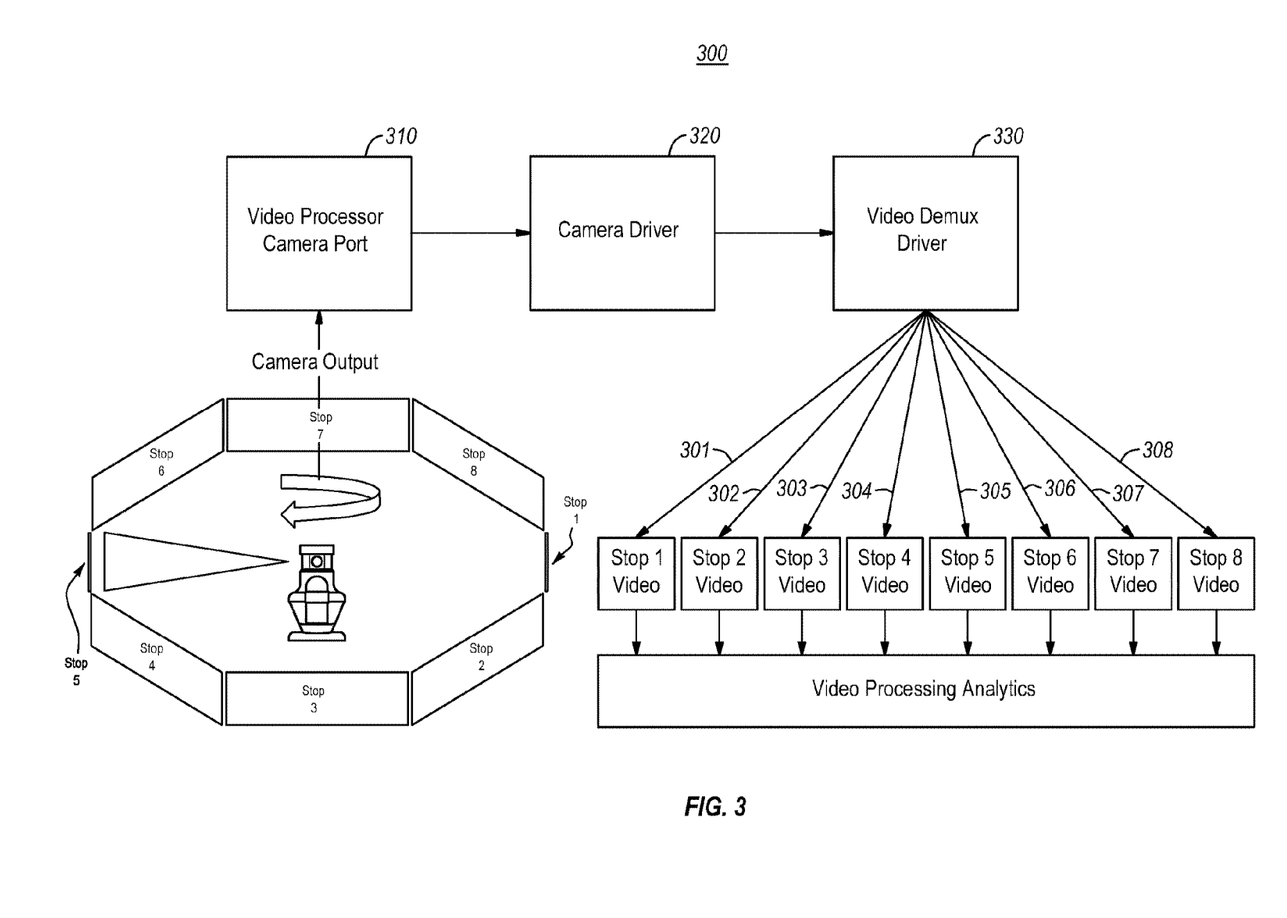
FIG. 3 schematically illustrates an example implementation in which the video processor illustrated in FIG. 1 may operate.

An exemplary implementation showing how video processor 140 may operate is described in more detail in FIG. 3. Referring to FIG. 3, video demultiplexing driver 330 separates the video stream into individual images (i.e., frames) that each correspond to a particular stop position, or virtual camera. For example, the video stream referred to at this stage may include images to be retained that were captured at different stop positions. Demulitplexing driver 330 may use position information tracked by microprocessor 110 to determine the corresponding virtual camera for each image of the video stream, allowing sorting of the images to their proper virtual camera devices. As illustrated by FIG. 3, each image can be sent to its corresponding virtual camera (301-308) for storage and future analytics (e.g., comparison of images taken adjacent in time from the same stop position), once that determination has been made.

If desired, images from different stop positions may be stitched together to create a panoramic image (e.g., of up to 360°). An advantage of the present embodiments is that any such stitching is optional, and is typically not carried out on-site (if at all). If done, stitching may be done off-site, allowing the total power requirements for on-site system 100 to be no more than about 10 watts, as stitching is power and computer processor intensive.

In some implementations, the video stream associated with a given virtual camera device may be analyzed to detect a change from a given image to a subsequent image. In other words, rather than stitching together images to create a panoramic image, the analytics carried out may involve comparison of an image with a subsequently captured image (or a previously captured image) from the same stop position (and thus the same virtual camera device) to detect any changes (e.g., a change in temperature of an object, movement of an object, etc.). For example, the analytics carried out may include fire detection, as discussed in the inventors' prior PCT Patent Application Serial No. PCT/US/2014/033539 filed Apr. 9, 2014 titled STEPPER MOTOR CONTROL AND FIRE DETECTION SYSTEM, and PCT Patent Application Serial No. PCT/US/2014/033547 filed Apr. 9, 2014 titled FIRE DETECTION SYSTEM, each of which is herein incorporated by reference in its entirety. Another example of use may include intruder detection, or perimeter monitoring to ensure security at a secure border, or the like.

Each virtual camera can have a video stream similar to that which would be obtained by a stationary camera placed at the corresponding stop position. The system of virtual cameras may be on-site relative to thermal imaging camera 150. In some implementations, the frame rate of a virtual camera video stream is equal to the rotational speed of motor 170, as camera 150 passes each stop once per revolution. The muxed signal frame rate may be equal to a rotational speed of motor 170 multiplied by the number of stops per revolution. For example, a system running at 30 RPM with 16 stops per revolution would have a muxed frame rate of 8 frames per second (FPS) and each virtual camera device would have a frame rate of ½ FPS, or 1 frame per 2 seconds (e.g., 30 RPM/60 seconds in a minute=0.5 FPS). While rotation rates of less than 60 RPM may be typically employed, it will be appreciated that any suitable RPM may be used (e.g., either higher or lower).

Utilizing virtual cameras can allow analytics and any stitching to be decoupled from image acquisition. Because each virtual camera can have its own video stream, images associated with each virtual camera can be processed independently. System 100 may normally capture images in numerical (e.g., clockwise or counter-clockwise) order, but because the angle offset from home position (i.e., stop position 1) is known based on the stop number of the virtual camera, analytics or any stitching may update in any order desired.

Additional details of exemplary fire detection systems, including the ability to correlation of geographical location data and determination of depth values is found in PCT Patent Application Serial No. PCT/US/2014/033547 filed Apr. 9, 2014 titled FIRE DETECTION SYSTEM, already incorporated by reference in its entirety.

Correlating geographical location data with the position of camera 150 can include, but is not limited to, correlating pixel positions of a captured image and determining depth values for pixel positions of individual thermal imaging camera images based on the geographical location of thermal imaging camera 150. Given the elevation and orientation of thermal imaging camera 150, the distance or depth value for each pixel of an image may be calculated using elevation data, for example, from the National Elevation Dataset.

The depth value calculation to be associated with a given pixel can be done in a series of steps for determining (e.g., calculating) how each pixel represents a ray projected from the camera across the landscape intersecting the ground. Generally, this may be achieved by using a projected camera view on a wireframe terrain model created using elevation data (e.g., from the National Elevation Dataset) to estimate where each rendered pixel of the camera view would intersect the wireframe to calculate the probable "z" depth value of the bottom of each image element or pixel. Such a process may employ a loop process carried out through increasing z-distances until the projected height intersects the elevation height at a distance.

This may be done by determining (e.g., calculating) if a ray having a length equal to the camera's height intersects the ground at the projected distance. This determination may be repeated by repeatedly increasing the ray length by a given amount (e.g., 1 decimeter) until the ground is reached (e.g., intersected) or the ray exceeds a given length (e.g., 30 kilometers). Such an excessive length may be used to help render the horizon. Data for latitude, longitude, elevation and distance of the intersection point may be stored, and the determination (e.g., calculation) may be repeated for the next pixel of a column. Progressing upwardly from the bottom, within the image, once a column of pixels reaches the horizon, the determination may move onto a new column. Such determinations or calculations may be based off variable Vertical Field of View, Horizontal Field of View, elevation and orientation. The final data set may be used to render an image that depicts distance (e.g., in gray scale) with lines placed at a given distance (e.g., every 100 meters). The determined or calculated image may be compared against an actual image for a final adjustment of the input variables. Once completed, the final result would provide a "z" depth value map that can be saved for future immediate analytics availability.

Illustrative of the steps described above, an image of 640×512 may require repetition of the described determinations approximately 250,000 times.

Once depth values for pixel positions are determined, this may allow determination of the size or movement speed of an object captured within an image. For example, it may provide information on the size or movement speed of a wildfire, person, animal, or any other object of interest. Processing that correlates pixel positions of an image with location data and determination of a depth value associated with each pixel may be performed off-site at a remote user interface terminal. The actual depth values associated with given pixels of the images may be relayed to the camera system for storage and use on-site.

Relay of any data on-site to off-site or vice versa may be by any suitable mechanism, e.g., including, but not limited to satellite link or network, cellular link or network, WiFi link or network, radio transmission, hard wired link or network, etc.

With this background being laid, additional details are now illustrated.

Figure 4:
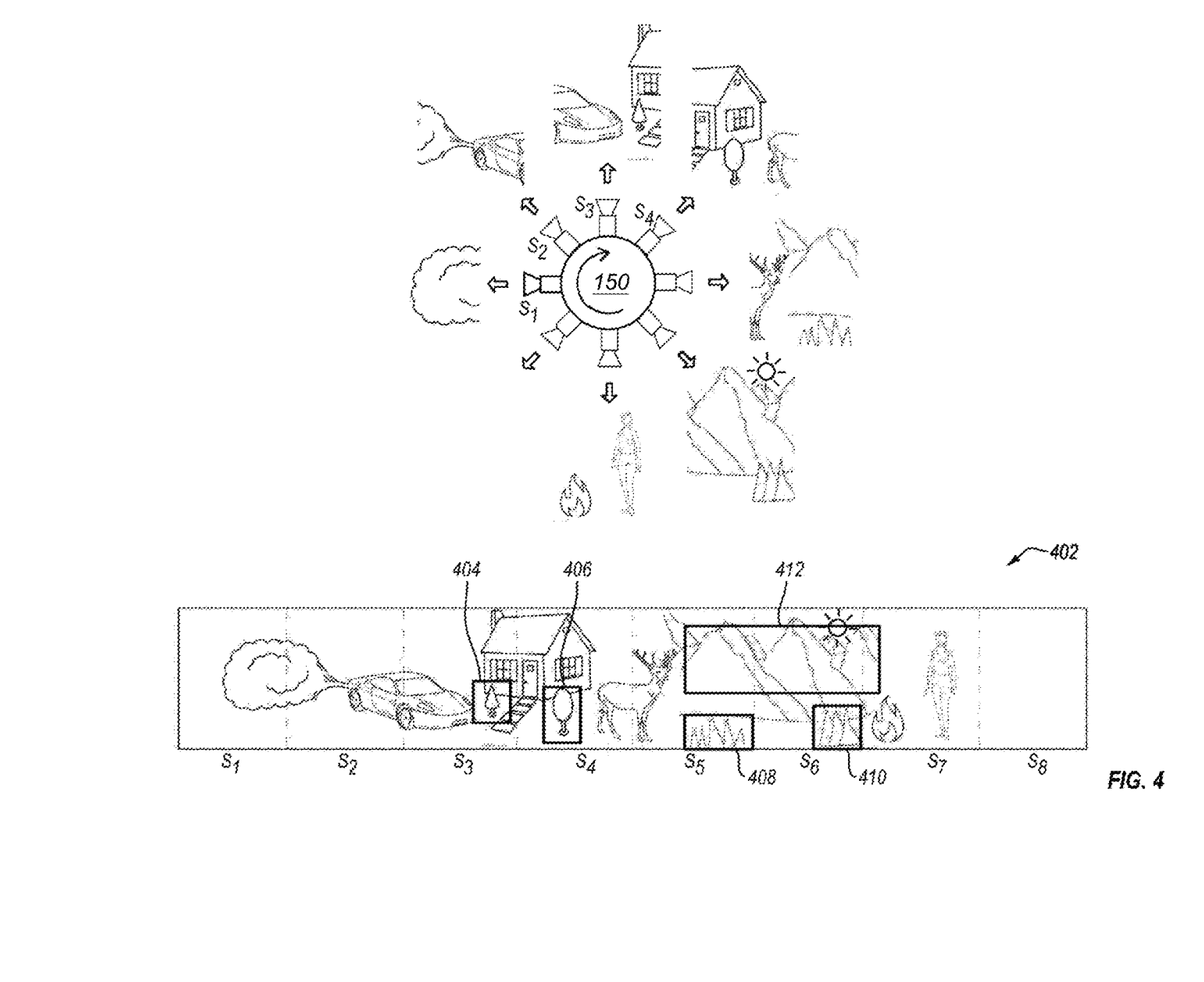
FIG. 4 illustrates a thermal imaging camera in an environment allowing the camera to capture a plurality of images at corresponding stop positions.

Reference is now made to FIG. 4 which illustrates the camera 150 capturing a plurality of images at various stops and the images optionally being stitched into a panoramic image 402. While FIG. 4 illustrates the panoramic image 402, it should be appreciated that embodiments do not require the images to be stitched together, but rather, individual images can be processed by a virtual camera such as virtual cameras 301-308 illustrated in FIG. 3.

Embodiments may be implemented where, at a virtual camera, foreground objects are scored based on the amount of change compared to a background model. For example, a score may be generated based on the amount of changes between pixels (or edges) in a background image and the corresponding pixels (or edges) in a subsequent image. Scoring may be based, for example, on an aggregation of changes over a number of different pixels (or edges). In particular, the cumulative changes over a selected region may represent the score for the region. For example, the number of pixels or edges associated with a given object (e.g., a power pole, a utility trailer, etc.) may be determined, for later reference. The system may compare the number of pixels or edges of the object at a later time, to determine whether the object has changed (the number of pixels or edges has changed over a threshold value), or if the object is the same as before. This may be particularly useful during sunset and sunrise, when objects may appear to be changing, but upon counting the number of pixels or edges associated with such a stationary object, it will be apparent that the object has not changed, only the background.

The particular background model can include user defined regions within a video frame where each region is assigned a sensitivity score. For example, FIG. 4 illustrates four user defined regions 404, 406, 408, 410 and 412. Regions 404, 406, 408 and 410 are selected to encompass various pieces of vegetation. As wind or other factors may cause movement in the vegetation, these regions may be configured to be less sensitive to movement than other regions are. In particular, when comparing video frames with a background image, any comparison of the defined regions 404, 406, 408, 410 and 412 in the background image to corresponding regions in subsequent video frames will be allowed a certain amount of variation without causing an alarm or other indication that there is a change in the object or background. Even though there may be a slight change due to swaying vegetation, such slight changes will not cause an event to be triggered indicating a change.

In contrast, the region 412 may be defined such that little or no change is allowed. The region 412 is set to define a region including a mountain range which should remain quite static. Such a region may similarly be defined around various pieces of equipment such as trailers, buildings, power poles, and the like that may generally remain stationary. Thus, this region 412 could be defined to be more sensitive to change such that even slight changes will cause an alarm or other indication of a change to be triggered.

Thus, embodiments may be implemented where foreground object scores are compared to the region of interest in which they were detected to determine if they are background or foreground objects. A user may have control over sensitivity of movement detection over all coordinates of the video frame. As shown, a user-defined region of interest may span across more than 1 virtual camera position (e.g., as region 412 does), even if no panoramic stitching is performed. Embodiments can be implemented which do not require extra memory buffers for learning or learning time to allow for background motion to be detected. Rather, a user can manually define where background motion might occur. The user can increase sensitivity by increasing the motion detection range in areas where there is little or no repetitive motion (or where none should be) while still allowing detection of motion in areas where there is a lot of repetitive motion by decreasing the sensitivity and the motion detection range for these areas. This gives a user more control over detection range and percentage of objects falsely detected as foreground objects of interest (e.g., an intruder). In some embodiments, there may be a default level of sensitivity for all regions of the video frame that are not user defined (i.e., not selected by the user and given a specific sensitivity). For example, all regions that are not user defined may be assumed to remain relatively static and thus have a relatively high sensitivity to any changes.

To allow a user to define the various regions, embodiments may first create a background model. The background model may be based on a background image, such as the panoramic image 402 (or the individual images associated with stops S1-S8). The panoramic image 402 may be provided to, or created on a user system 190. The user system 190 may be remote from the camera system 100. Thus, images may be provided from the camera system 100 to be used in creating a background model. In one embodiment, the panoramic image 402 is provided as part of a user interface at the user system 190. The user system 190 may include a user interface that allows a user to select regions on the overall panoramic image 402. For example, the user interface may include the ability to allow a user to drag and select a region using mouse graphical user interface interactions. While this would allow for selecting rectangular regions, it should be appreciated that other regions may also be selected. For example, a user could select a region bounded by an ellipse, a triangle, or some other complex shape. A user may also be able to select a region by drawing the region using any applicable graphical user interface interactions (e.g., a mouse, a finger or stylus when using a touchscreen device, and so forth). In some embodiments, any portions of the image not selected by the user may represent a region that can be associated with an image change tolerance and set forth in more detail below.

The user can also indicate, using the user interface, a sensitivity for a selected region. The selected regions can be converted to coordinates (such as Cartesian coordinates) which can then be provided back to the camera system 100 along with the sensitivities. This information can then be used by the camera system as part of the background model used to determine when indications of changes should be issued to a user.

When selecting regions, by using the stitched image, or other similar image or set of images, a user can select multiple regions in a given stop. Alternatively or additionally, a user can select a region that spans multiple stops. In some embodiments, regions may be automatically selected and given a particular sensitivity by the system 100. Such selections and sensitivities may be determined by system 100 based on historical data. For example, the system 100 may automatically determine that an area with numerous trees should be given a low sensitivity, while an area with little-to-no vegetation should be given a high sensitivity. Similarly, in an area where security is particularly important (e.g., of a stockyard, border area, building installation, or other facility or environment), the surrounding area may be given a higher sensitivity than other areas.

Embodiments may alternatively or additionally use one or more descriptive filters to distinguish between background changes and new foreground objects in an image. Using filters can reduce the number of times or the complexity of computationally expensive algorithms that may need to be used for object classification. This can allow object classification to be, at least partially, performed at a low-power, limited resource (e.g. limited memory, limited processing power, etc.) system. Even on higher power, higher resource systems, such functionality can reduce power consumption.

Illustrating now an example, an image may differ from a background image which may indicate a new foreground object in an image or simply a change to the background. Various environmental inputs and/or various filters may be used to filter out background changes which appear as foreground objects. Alternatively, new foreground objects can be filtered out when it can be determined that they are not foreground objects of interest.

Illustratively, one embodiment uses a distance map to determine distance and size of a foreground object, i.e. a detected change in an image. This distance map may be generated, for example, using a method similar to that described above for calculating a probable "z" depth value. Accordingly, a size filter may be used to filter out objects based on their size. For example, it may be determined that only animals and/or people within a field of view of the thermal camera are objects of interest. Thus, all objects detected that are bigger than an animal or person may be filtered out.

Another filter may be based on the aspect ratio, pixels, or number of edges of the candidate foreground object to determine a probability of it being a specific object type. For example, the aspect ratio of a car when viewed from the front is significantly different than the aspect ratio of a motorcycle when viewed from the front, thus filtering out cars, but not motorcycles, or vice versa, may be possible. Accordingly, a user may identify which types of objects are of interest to the user, then use their associated sizes to filter out objects that are not of interest.

In one embodiment a correlation filter is used to determine if a potential foreground object matches an object in a background model. In particular, the background model can be examined for a matching object in the vicinity of the potential foreground object. This can help to identify that perhaps a tree has swayed, a large rock has been moved, or some other movement has occurred that may not be of interest to a user rather than having detected a new foreground object. Accordingly, a false detection and subsequent false alarm to a user may be avoided by using a correlation filter.

An edge detection filter may be used in a similar manner. The edge detection filter may be based on the number of edges of a foreground object. For example, if animal movement were of interest, animals have a large number of outline edges when compared to an automobile. Thus, a filter may be configured to filter out objects with few edges while allowing the appearance of foreground objects with a larger number of edges to cause a user to be notified of changes to an environment. Thus, a system could count the edges in the foreground candidate to see if it is complex enough to be an object of interest to a user.

An edge filter may be particularly useful during the periods of time that the sun rises and sets because the sun itself may give the camera system a false positive. More specifically, while the sun is setting and rising, the sun may be in view of the camera, thus causing the camera to detect a new source of heat (i.e., an object) in the location of the setting or rising sun. As such, a false alarm or alert could be sent to a user that an unwanted object has entered the surveilled area. Accordingly, by implementing an edge filter during those periods of time, objects (e.g., trees, telephone poles, cars, houses, buildings, trailers, and so forth) in the field of view (foreground or background objects) may be compared against a background model to ensure that the number of edges of all detected objects is the same currently as it is in the background model.

For example, a particular area that is being surveilled by a thermal camera may include a building and telephone or power pole. When the sun sets in that particular area and comes within the field of view of the thermal camera, an edge detection filter may be applied in order to detect the number of edges of all the objects within the field of view of the camera. As such, the only detected objects would be the building and the pole, which would result in the same number of edges as the background model of the same area. Thus, it would be determined that no new objects had entered the area (as the number of edges is the same). Accordingly, any false positives occurring because of a sunrise or sunset may be mitigated or eliminated. Accordingly, by implementing an edge filter during those periods of time, objects in the field of view (foreground or background objects) may be compared against a background model to ensure that the number of edges of the detected objects is the same currently as it is in the background model, thus avoiding any false positives caused by the sun.

In some embodiments, an edge filter may be automatically implemented each day during sunrise and sunset for that particular day. In such an embodiment, a database containing information regarding times for sunrises and sunsets for each day of the year in particular locations may be accessed to determine the appropriate times to apply the edge detection filter. For example, an edge filter may be automatically implemented from 6:15 a.m. until 6:45 a.m. while the sun is rising and from 7:15 p.m. until 7:45 p.m. while the sun is setting on a particular day based on data contained within a particular database. Similarly, an edge filter may be implemented during periods of the day that may be much hotter than others (i.e., where objects may appear much hotter) and then the number of edges can tell the user that no intruder has entered the property.

Similar analysis and conclusions may be possible by counting the number of pixels associated with a given object, particularly where the object is expected to be stationary (a pole, a building, a trailer, or the like).

In another example, a filter may be a thermal filter. Thermal cameras capture differences in temperature. Wildlife may have a different difference in temperature than an ambient temperature from humans, automobiles, motor cycles, the setting sun, the rising sun, and so forth. Thus, filters could be created to filter out humans and automobiles while allowing animals to be detected (or vice versa).

Alternatively or additionally, confidence level filters can be applied. A user can adjust confidence level for any number of regions in the video frame to determine required level of confidence to classify a foreground object. For instance, a user may assign a low confidence level to a certain region because there is a high quantity of vegetation (trees, bushes, and so forth) in the region, or for any other reason. Accordingly, in order to identify a foreground object in such a region, there must be a high level of movement detected. Filters can be applied in any order. Further, any number of filters can be included or excluded from execution. Additional filters, while not illustrated here could be nonetheless applied to embodiments herein.

Figure 5:
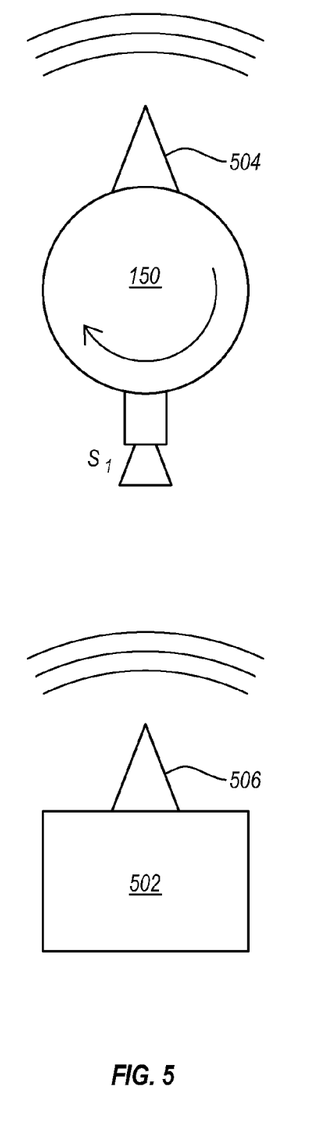
FIG. 5 illustrates communication between a thermal imaging camera and an event dispatcher.

As illustrated in FIG. 5, whether or not a filter is applied, once one or more objects of interest are detected an alert or alarm (used interchangeably herein) may be sent to an alert dispatcher 502. More specifically, FIG. 5 illustrates transmission of data from the on-site camera system 150 through a wireless transmitter 504 to a wireless receiver 506. Wired transmission is of course also possible. This data may include, for example, location of the object, size of the object, aspect-ratio of the object, temperature of the object, and so forth. Continuous monitoring of the object can provide additional data such as changes in size and speed. These alerts may also include a confidence level of the alert/object. For example, high confidence alerts may be of sufficient certainty to dispatch aircraft or other response units very early, potentially saving time, money, property, and so forth.

Figure 6:
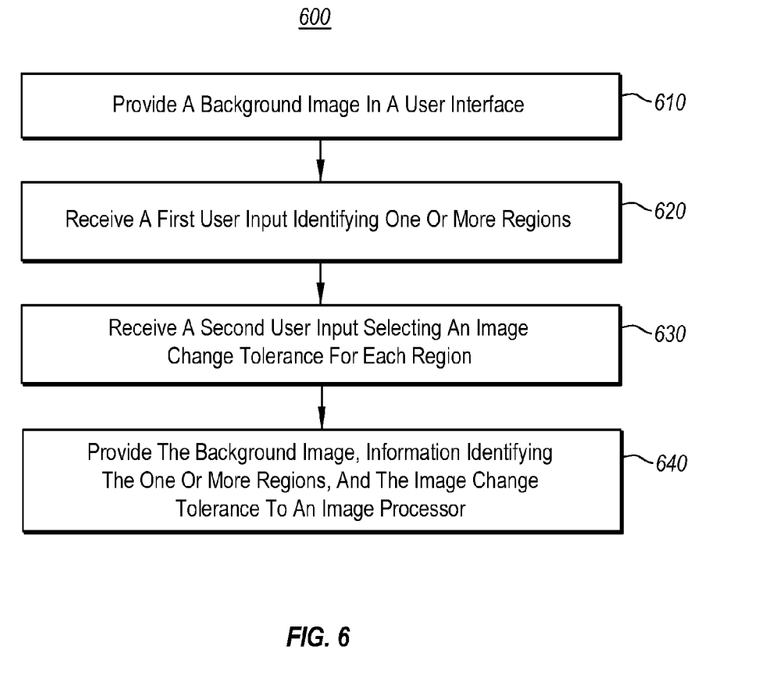
FIG. 6 illustrates a method of creating a background model for image processing to identify new foreground objects in successive video frames.
Figure 7:
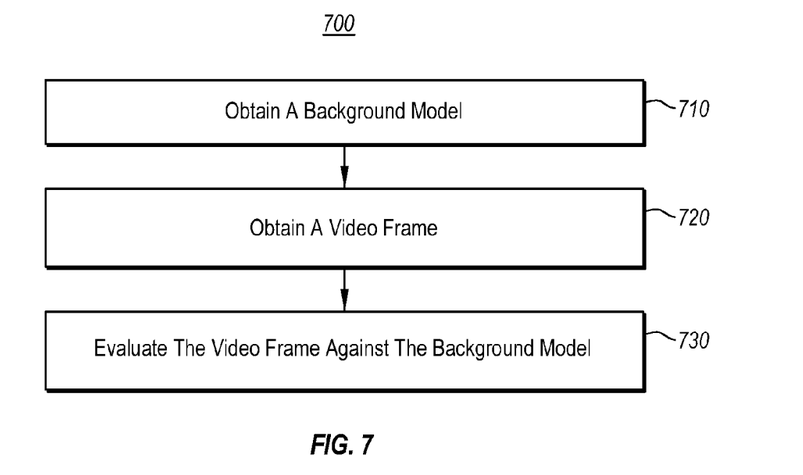
FIG. 7 illustrates a method of identifying a foreground object in a video frame by comparing the video frame to a background model.
Figure 8:
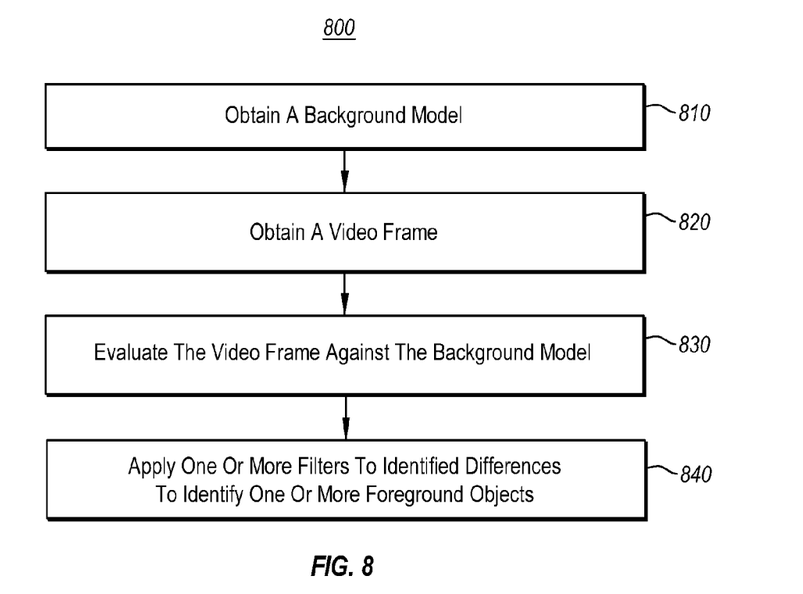
FIG. 8 illustrates a method of identifying foreground objects of interest in a video frame.

FIGS. 6-8 illustrate three different flowcharts for performing embodiments described herein. It should be noted that FIGS. 6-8 are described with frequent reference to FIG. 4. Referring now to FIG. 6, a method 600 is illustrated. The method includes acts for creating a background model for image processing to identify new foreground objects in successive video frames. The method 600 includes providing a background image in a user interface (Act 610). For example, a background image taken at stop position S3 (illustrated in FIG. 4) includes at least a portion of a car and house. The method further includes receiving a first user input in the user interface, wherein the first user input comprises identifying one or more different regions within the background image (Act 620). For example, the first user input may identify region 404. The user input may be of any suitable type. For instance, a user may identify a region using a click-and-drag rectangular selection tool using a mouse.

The method further includes receiving a second user input in the user interface, the second user input comprising selecting an image change tolerance for each of the one or more identified different regions (Act 630). For instance, the user may select an image change tolerance for region 406 that necessitates a relatively high amount of change before detecting a foreground object because the bush in region 404 may consistently move because of wind. The method 600 further includes providing the background image, information identifying the one or more different regions, and the image change tolerances to an image processor (Act 640). The background image, the information identifying the one or more different regions, and the image change tolerances are used by the image processor to create a background model to thereby compare a successive image with the background model in order to identify one or more foreground objects within the successive image (Act 640). Thus, by selecting specific regions within a field of view of camera 150 and giving each specified region an image change tolerance, a user may help create a contextually aware background model, against which successive images can be compared.

FIG. 7 illustrates a method of identifying a foreground object in a video frame by comparing the video frame to a background model. The method 700 includes obtaining a background model (such as the background model described above in connection with FIG. 6), wherein the background model comprises a background image and identifies one or more user defined regions (Act 710). Each of the one or more user defined regions can include an image change tolerance (Act 710), as described above.

The method further includes obtaining a video frame (Act 720) that is evaluated against the background model, such that a foreground object is identified in a region of the video frame when a score for the foreground object exceeds the image change tolerance for the region in which the foreground object is located (Act 720). Thus, referring back to the example of FIG. 6 and region 404, region 404 may have a low sensitivity to change because of the bush located within the region. Accordingly, in order for a foreground object to be identified within region 404, the object must demonstrate more movement than simply the branches/leaves of the bush within region 404 swaying in the wind.

FIG. 8 illustrates a method, implemented at a computer system, of identifying foreground objects of interest in a video frame. The method 800 includes obtaining a background model, wherein the background model comprises a background image (Act 810). The method further includes obtaining a video frame (Act 820) and evaluating the video frame against the background model to identify objects, including identifying differences between the video frame and the background image (Act 830), as described above. Perhaps as part of the evaluation, or after performing an initial evaluation, one or more filters may be applied to the identified differences in order to identify one or more foreground objects of interest in the video frame (Act 840). For instance, once an object has been identified during the evaluation of a video frame against the background model, a filter, such as a size filter, may be used to filter out objects that are not of interest. More specifically, the bush within region 404 may initially be identified as a potential object of interest because the wind caused it to move when comparing background model to the video frame. However, a size filter may be applied that specifies that objects smaller than a person are not of interest. Thus, the bush within region 404 would be filtered out rather than being reported to a user. Similarly, any of the filters described herein may be used.

Accordingly, a thermal camera system may allow users to identify particular regions within the field of view of the camera, and additionally, to select a particular image change tolerance for each specified region. Notably, filters may be applied to any potential identified objects to filter out objects that are not of interest. In this way, a user can customize the thermal imaging camera system to identify only objects of interest to the user and further alert the user only in instances where such an object has been identified.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of creating a background model for image processing to identify new foreground objects in successive video frames, the method comprising:
providing a background image in a user interface;
receiving a first user input in the user interface, the first user input comprising identifying one or more different regions within the background image;
receiving a second user input in the user interface, the second user input comprising selecting an image change tolerance for each of the one or more identified different regions, wherein the image change tolerance for each of the one or more identified different regions defines a threshold amount of change that is required to be detected as between (i) the one or more identified different regions within the background image and (ii) one or more corresponding identified different regions within a successive image in order for one or more objects within the successive image to be classified as one or more foreground objects;
providing the background image, information identifying the one or more different regions, and the image change tolerances to an image processor, wherein the background image, the information identifying the one or more different regions, and the image change tolerances are used by the image processor to create a background model to thereby compare the successive image with the background model in order to identify the one or more foreground objects within the successive image; and
in response to determining that a particular foreground object included in the one or more foreground objects is an object of interest, sending an alert that includes information describing the object of interest, wherein the information includes a confidence level indicating a computed certainty that the object of interest is a foreground object within the successive image as opposed to being a background object within the successive image such that the confidence level provided by the alert facilitates identification and classification of the object of interest.

2. The method of claim 1, wherein the background image is a 360 degree panorama image.

3. The method of claim 1, wherein receiving the first user input comprises receiving a drag and select user input that identifies a region boundary.

4. The method of claim 1, wherein the information identifying the one or more different regions comprises Cartesian coordinates derived from the user input identifying the one or more different regions within the background image.

5. The method of claim 1, wherein identifying one or more foreground objects within the successive image comprises determining that a change from the background image to the successive image in a region exceeds an image change tolerance for the region such that the foreground object is identified in the region when a score for the foreground object exceeds the image change tolerance for the region in which the foreground object is located.

6. The method of claim 1, wherein the image processor further applies one or more filters to the foreground object to filter out certain foreground objects to identify one or more foreground objects of interest in the successive video frame.

7. The method of claim 6, wherein one of the one or more filters comprises an edge detection filter.

8. The method of claim 6, wherein one of the one or more filters comprises a confidence level filter.

9. A method of identifying a foreground object in a video frame by comparing the video frame to a background model, the method comprising:
  obtaining a background model, wherein the background model comprises a background image and identifies one or more user defined regions, each of the one or more user defined regions including an image change tolerance, and wherein the image change tolerance for each of the one or more user defined regions defines a threshold amount of change that is required to be detected as between (i) the one or more user defined regions within the background image and (ii) one or more corresponding user defined regions within a successive image in order for one or more objects within the successive image to be classified as one or more foreground objects;
  obtaining a video frame that includes the successive image;
  evaluating the successive image against the background model such that a foreground object is identified in a region of the successive image when a score for the foreground object exceeds the image change tolerance for the region in which the foreground object is located; and
  in response to determining that the foreground object is an object of interest, sending an alert that includes information describing the object of interest, wherein the information includes a confidence level indicating a computed certainty that the object of interest is a foreground object within the successive image as opposed to being a background object within the successive image such that the confidence level provided by the alert facilitates identification and classification of the object of interest.

10. The method of claim 9, wherein the background image is a 360 degree panorama image.

11. The method of claim 9, wherein the score comprises an amount of change between pixels when comparing the background model to the video frame containing the foreground object.

12. The method of claim 9, further comprising using one or more filters to identify foreground objects.

13. The method of claim 9, wherein one of the one or more filters comprises an edge detection filter.

14. A method, implemented at a computer system, of identifying foreground objects of interest in a video frame, the method comprising:
  obtaining a background model, wherein the background model comprises a background image and a user defined region, wherein the user defined region is associated with an image change tolerance, and wherein the image change tolerance defines a threshold amount of change that is required to be detected as between (i) the user defined region within the background image and (ii) a corresponding user defined region within a successive image in order for one or more objects within the successive image to be classified as one or more foreground objects;
  obtaining a video frame that includes the successive image;
  evaluating the successive image against the background model to identify objects, including identifying differences between the successive image and the background image;
  applying one or more filters to the identified differences to identify a foreground object of interest in the successive image; and
  in response to identifying the foreground object of interest, sending an alert that includes information describing the object of interest, wherein the information includes a confidence level indicating a computed certainty that the object of interest is a foreground object within the successive image as opposed to being a background object within the successive image such that the confidence level provided by the alert facilitates identification and classification of the object of interest.

15. The method of claim 14, wherein the background image and video frame are 360 degree panoramic images.

16. The method of claim 14, wherein the one or more filters includes an aspect ratio filter that filters out objects based on their aspect ratios.

17. The method of claim 14, wherein the one or more filters includes a correlation filter that filters out an object based on the object's similarity to a background model object that is contained within the background image.

18. The method of claim 14, wherein the one or more filters includes an edge detection filter that filters out one or more objects based on a number of edges that the one or more objects have.

19. The method of claim 14, wherein the one or more filters includes a size filter that filters out one or more objects based on corresponding sizes of the one or more objects.

20. The method of claim 14, wherein the one or more filters includes a thermal filter that filters out one or more objects based on their thermal characteristics.

* * * * *